US011687867B2

(12) United States Patent
Muramoto

(10) Patent No.: US 11,687,867 B2
(45) Date of Patent: Jun. 27, 2023

(54) COMPUTER-READABLE RECORDING MEDIUM RECORDING EVALUATION PROGRAM, INFORMATION PROCESSING APPARATUS, AND EVALUATION METHOD

(71) Applicant: FUJITSU LIMITED, Kawasaki (JP)

(72) Inventor: Takahide Muramoto, Zama (JP)

(73) Assignee: FUJITSU LIMITED, Kawasaki (JP)

( * ) Notice: Subject to any disclaimer, the term of this patent is extended or adjusted under 35 U.S.C. 154(b) by 366 days.

(21) Appl. No.: 16/929,153

(22) Filed: Jul. 15, 2020

(65) Prior Publication Data

US 2020/0342371 A1 Oct. 29, 2020

Related U.S. Application Data

(63) Continuation of application No. PCT/JP2018/002584, filed on Jan. 26, 2018.

(51) Int. Cl.
*G06Q 10/067* (2023.01)
*G06F 16/21* (2019.01)

(52) U.S. Cl.
CPC ........... *G06Q 10/067* (2013.01); *G06F 16/21* (2019.01)

(58) Field of Classification Search
CPC ...... G06Q 10/067; G06Q 40/00; G06F 40/14; G06V 30/414; G06V 30/416; G06V 10/751
See application file for complete search history.

(56) References Cited

U.S. PATENT DOCUMENTS

2003/0198850 A1 10/2003 Suzuki et al.
2010/0042909 A1 2/2010 Tanahashi
(Continued)

FOREIGN PATENT DOCUMENTS

JP 2003-316765 A 11/2003
JP 2005-267195 A 9/2005
(Continued)

OTHER PUBLICATIONS

Li, Z. (2014). An XML-based system for management and query of video databases with user identifiable and annotated scenes (Order No. 1584639). (Year: 2014).*
(Continued)

*Primary Examiner* — Maria C Santos-Diaz
(74) *Attorney, Agent, or Firm* — Fujitsu Patent Center

(57) ABSTRACT

A non-transitory computer-readable recording medium records an evaluation program for causing a computer to execute processing including: acquiring a record group that includes a plurality of ordered records and includes a plurality of item values in which each record is associated with each of a plurality of items; specifying a first record and a second record associated with order having a predetermined relationship with order associated with the first record from among records included in the acquired record group; determining whether or not an item value associated with a second item included in the first record satisfies a condition in a case where an item value associated with the first item among item values included in the first record is different from an item value associated with the first item among item values included in the second record; and evaluating the first record on the basis of the determination result.

5 Claims, 15 Drawing Sheets

(56) References Cited

U.S. PATENT DOCUMENTS

| | | |
|---|---|---|
| 2012/0078919 A1 | 3/2012 | Mineno |
| 2019/0095412 A1* | 3/2019 | Onogi .................. G06F 40/123 |
| 2019/0164063 A1* | 5/2019 | Moura .................. G06N 5/022 |

FOREIGN PATENT DOCUMENTS

| | | |
|---|---|---|
| JP | 2008-165641 A | 7/2008 |
| JP | 2012-73951 A | 4/2012 |
| WO | 2008/041310 A1 | 4/2008 |
| WO | 2015/166973 A1 | 11/2015 |
| WO | 2017/199309 A1 | 11/2017 |

OTHER PUBLICATIONS

Japanese Office Action dated Aug. 24, 2021 for corresponding Japanese Patent Application No. 2019-567799, with English Translation, 10 pages.

Russian Office Action dated Jun. 9, 2021 for corresponding Russian Patent Application No. 2020124582, with English Translation, 14 pages.

International Search Report and Written Opinion of the International Searching Authority (Form PCT/ISA/210, 220, and 237), mailed in connection with PCT/JP2018/002584 and dated Apr. 24, 2018 (16 pages).

* cited by examiner

FIG. 2

| | | | |
|---|---|---|---|
| AREA | SHOP | SALES | |
| Tokyo | | | |
| | SubTotal | | |
| Kanagawa | | | |
| | SubTotal | | |
| Chiba | | | |
| | SubTotal | | |
| Saitama | | | |
| | SubTotal | | |
| Total | | | |

FIG. 3

[INFORMATION REGARDING ASSOCIATION BETWEEN CELL AND XBRL ELEMENT]
COLUMN A: IN A CASE OF AREA ⇒ VALUE OF Area
          IN A CASE OF TOTAL ⇒ VALUE OF Level (Total)
COLUMN B: IN A CASE OF SHOP ⇒ VALUE OF Shop
          IN A CASE OF SUBTOTAL ⇒ VALUE OF Level (Total)
COLMN C: VALUE OF <Sales> ELEMENT

[HIERARCHICAL STRUCTURE OF Y-AXIS HEADER]
```
<root> -+- "Tokyo" -+- SHOP [REPETITION]
        |           |
        |           +- "SubTotal"
        |
        ===
        |
        +- "Saitama" -+- SHOP [REPETITION]
        |             |
        |             +- "SubTotal"
        |
        +- "Total"
```

FIG. 4

| AREA | SHOP | SALES |
|---|---|---|
| Tokyo | Shinjyuku | 100 |
| | Ikebukuro | 120 |
| | Shibuya | 140 |
| | Kamata | 160 |
| | Ueno | 180 |
| | SubTotal | 700 |
| Kanagawa | Kawasaki | 200 |
| | Yokohama | 220 |
| | Atsugi | 240 |
| | Fujisawa | 260 |
| | SubTotal | 1,620 |
| Chiba | Funabashi | 300 |
| | Urayasu | 320 |
| | Makuhari | 340 |
| | SubTotal | 960 |
| Saitama | Ohmiya | 400 |
| | Urawa | 420 |
| | SubTotal | 820 |
| Total | | 4,100 |

FIG. 5

| AREA | SHOP | SALES | |
|---|---|---|---|
| Tokyo | Shinjyuku | 100 | |
| | Ikebukuro | 120 | |
| | Shibuya | 140 | |
| | Kamata | 160 | |
| | Ueno | 180 | |
| | subTotal | 700 | ← HEAD CHARACTER IS LOWERCASE LETTER a1 |
| Kanagawa | Kawasaki | 200 | |
| | Yokohama | 220 | |
| | Atsugi | 240 | |
| | Fujisawa | 260 | |
| | subtotal | 1,620 | ← ALL CHARACTERS ARE LOWERCASE LETTERS a2 |
| Chiba | Funabashi | 300 | |
| | Urayasu | 320 | |
| | Makuhari | 340 | |
| | SubTotal | 960 | ← BLANK AT END a3 |
| Saitama | Ohmiya | 400 | |
| | Urawa | 420 | |
| | SubTotal | 820 | ← ALL CHARACTERS ARE FULL-WIDTH CHARACTERS a4 |
| Total | | 4,100 | |

| SALES LIST | | |
|---|---|---|
| AREA | SHOP | SALES |
| Tokyo | Shinjyuku | 100 |
| | Ikebukuro | 120 |
| | Shibuya | 140 |
| | Kamata | 160 |
| | Ueno | 180 |
| | SubTotal | 700 |
| Kanagawa | Kawasaki | 200 |
| | Yokohama | 220 |
| | Atsugi | 240 |
| | Fujisawa | 260 |
| | SubTotal | 1,620 |
| Chiba | Funabashi | 300 |
| | Urayasu | 320 |
| | Makuhari | 340 |
| | SubTotal | 960 |
| Saitama | Ohmiya | 400 |
| | Urawa | 420 |
| | SubTotal | 820 |
| All | Total | 4,100 |

XML INSTANCE

```
<Sales area="Tokyo" shop="Shinjuku">100</>
<Sales area="Tokyo" shop="Ikebukuro">120</>
:
<Sales area="Tokyo" shop="SubTotal">700</>
:
<Sales area="Saitama" shop="Ohmiya">400</>
<Sales area="Saitama" shop="Urawa">420</>
<Sales area="Saitama" shop="SubTotal">820</>
<Sales area="All" shop="Total">4100</>
```

SALES LIST

| AREA | SHOP | SALES |
|---|---|---|
| Tokyo | Shinjyuku | 100 |
| | SubTotal | 100 |
| Saitama | Ohmiya | 200 |
| | SubTotal | 200 |
| All | Total | 300 |

XML INSTANCE

```
<Sales area="Tokyo" shop="Shinjuku">100</>
<Sales area="Tokyo" shop="SubTotal">100</>
<Sales area="Saitama" shop="Ohmiya">200</>
<Sales area="Saitama" shop="SubTotal">200</>
<Sales area="All" shop="Total">300</>
```

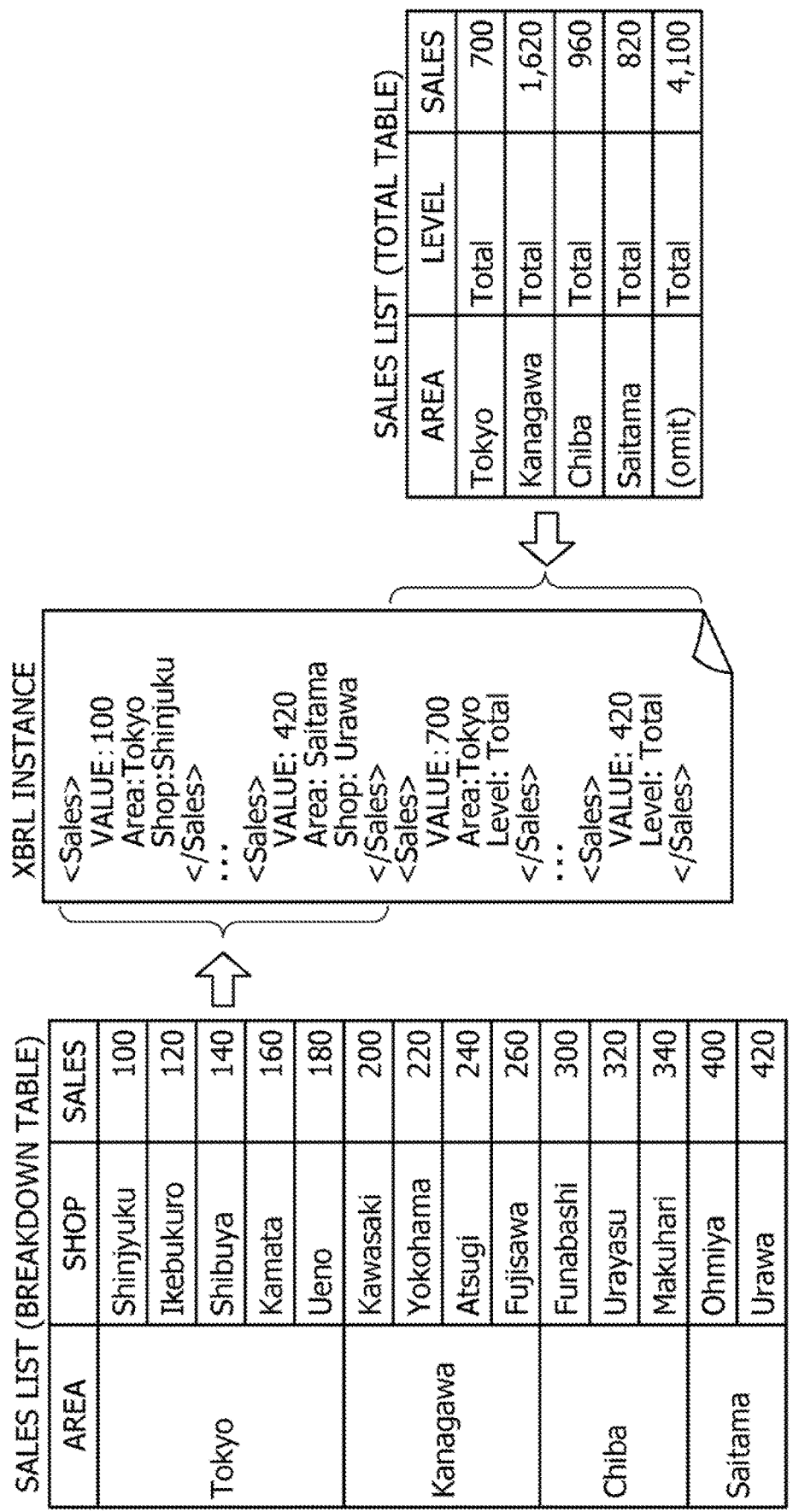

COMPUTER-READABLE RECORDING MEDIUM RECORDING EVALUATION PROGRAM, INFORMATION PROCESSING APPARATUS, AND EVALUATION METHOD

CROSS-REFERENCE TO RELATED APPLICATION

This application is a continuation application of International Application PCT/JP2018/002584 filed on Jan. 26, 2018 and designated the U.S., the entire contents of which are incorporated herein by reference.

FIELD

The embodiment relates to an evaluation program or the like.

BACKGROUND

Financial statements using eXtensible Business Reporting Language (XBRL) are obliged to submit to the Financial Service Agency. XBRL is an eXtensible Markup Language (XML) based language developed as a data description language used to easily prepare, distribute, and use business reports.

Related art is disclosed in International Publication Pamphlet No. WO 2017/199309.

SUMMARY

According to an aspect of the embodiments, a non-transitory computer-readable recording medium records an evaluation program for causing a computer to execute processing including: acquiring a record group that includes a plurality of ordered records and includes a plurality of item values in which each record is associated with each of a plurality of items; specifying a first record and a second record associated with order having a predetermined relationship with order associated with the first record from among records included in the acquired record group; determining whether or not an item value associated with a second item included in the first record satisfies a condition in a case where an item value associated with the first item among item values included in the first record is different from an item value associated with the first item among item values included in the second record; and evaluating the first record on the basis of the determination result.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a template sheet according to the embodiment.

FIG. 3 is a diagram illustrating an example of a mapping definition according to the embodiment.

FIG. 4 is a diagram illustrating an example of an input-completed sheet according to the embodiment.

FIG. 5 is a diagram illustrating another example of the input-completed sheet according to the embodiment.

FIG. 12A is a diagram illustrating a reference example of a table indicating an input-completed sheet input to a template sheet.

FIG. 12C is a diagram illustrating a reference example of the table indicating the input-completed sheet input to the template sheet.

DESCRIPTION OF EMBODIMENTS

The data of the financial statements submitted to the supervisory authorities, such as the Financial Service Agency or the Tokyo Stock Exchange, is referred to as an instance. The instance is created on the basis of a definition body (called "taxonomy") that is opened to the public by the supervisory authorities. Taxonomy includes schemas, in each of which a name or type information of an XBRL element corresponding to an item is defined, and link bases, in each of which a relationship between the XBRLs is defined. The relationship between the XBRL elements corresponds to, for example, display order, an aggregation method, or the like, of items in the financial statements.

Figure 11:
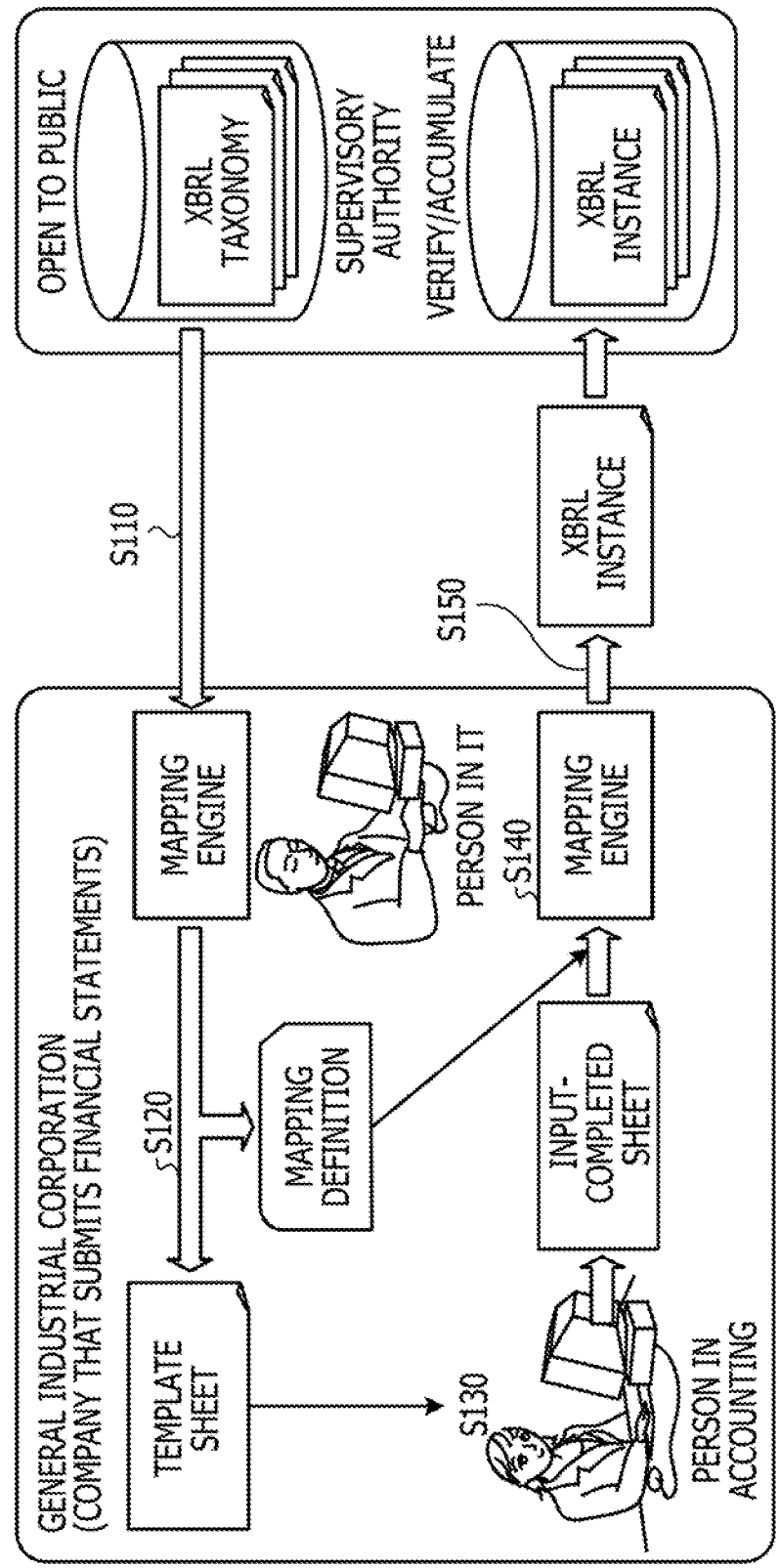
FIG. 11 is a diagram illustrating a reference example of a flow for creating an instance.

Here, a reference example of a flow for creating the instances as financial statements will be described with reference to FIG. 11. FIG. 11 is a diagram illustrating the reference example of the flow for creating the instance. In the supervisory authority, taxonomies described in the XBRL are stored and opened to the public. In a company that submits the financial statements, a mapping engine downloads a taxonomy opened to the public (S110) and generates a mapping definition and a template sheet on the basis of the taxonomy (S120). The template sheet indicates a table created by using spreadsheet software, such as Excel. The mapping definition indicates a definition in which position and size information of cells of a header portion or an input portion in the table is associated with property information of an XBRL element corresponding to the cell.

Then, a person in charge inputs financial data to the template sheet and creates an input-completed sheet (S130). The input-completed sheet is input to the mapping engine, and the mapping engine converts the input input-completed sheet into an instance by using the mapping definition (S140) and uploads the instance to the supervisory authority (S150). The supervisory authorities accumulate and verify the instances.

By the way, in recent years, there has been an increasing demand from the supervisory authorities and users to refine the financial reports. The refinement of the financial reports includes, for example, refinement from a company unit into a business office unit or refinement from an annual report to a monthly report. Furthermore, in response to the demand for the refinement of the financial reports, the international standard specification (table link base) used to describe a layout for XBRL data table display has been recommended. The table link base is used in a fixed length table, a variable length table, and a three-dimensional table in the taxonomy issued by the European public organizations. The financial reports in the future is expected to shift to the detailed financial reports using tables having different size and numbers for each company.

Figure 12B:
FIG. 12b is a diagram illustrating a reference example of the table indicating the input-completed sheet input to the template sheet.

FIGS. 12A, 12B, and 12C are diagrams illustrating reference examples of a table indicating an input-completed sheet obtained by making an input to a template sheet. Note that FIGS. 12A, 128, and 12C illustrate, for example, a case where the Financial Services Agency makes a company that has shops in Kanto area submit electronic data of a sales list of shops in Kanto area.

FIG. 12A is an input-completed sheet of a sales list of all shops, in Kanto area, of a company in a case where a size of the company is large. FIG. 12B is an input-completed sheet of a sales list of all shops, in Kanto area, of a company in a case where the size of the company is small. The mapping engine reads the sales list from the top to the bottom row by row for each input-completed sheet, extracts values of cells of the read row from the left to the right, and sets the value to a predetermined attribute value or element value so as to generate an XML instance.

FIG. 12C is a table in which the table of the sales list is divided into a breakdown table and a total table and is reproduced by using the table link base. It has been known that tables for a breakdown of an area and a total of an area are divided in the table link base.

Here, a technology has been known that determines a start position of a plurality of blocks included in the input-completed sheet when the input-completed sheet is converted into the instance. For example, for each row of the plurality of rows, an evaluation device compares a configuration (combination of character string and data type) of a cell acquired from the mapping definition and a configuration of a cell of a row of the input-completed sheet and evaluates the row to be compared according to the comparison result.

However, there is a problem in that a processing load regarding evaluation on a record included in an input-completed sheet may be applied when the input-completed sheet is converted into an instance.

For example, the input-completed sheet is a sheet obtained by making an input to a template sheet. However, there is a case where a character string of initial display of the template sheet is changed by a person in charge of a company that submits the financial statements or automatically changed by spreadsheet software. The character string of the initial display is defined by a taxonomy. When the character string of the initial display is changed, the changed character string and a character string that is a target of a mapping definition do not completely coincide with each other when a mapping engine converts the input-completed sheet into an instance by using the mapping definition, and the mapping engine assumes the inconsistency as an error. Therefore, in this case, when the input-completed sheet is converted into the instance, the processing load regarding the evaluation of the record included in the input-completed sheet is applied.

In one aspect, a processing load regarding evaluation on a record included in an input-completed sheet when the input-completed sheet is converted into an instance may be reduced.

Hereinafter, an embodiment of an evaluation program, an information processing apparatus, and an evaluation method disclosed in the present application will be described in detail with reference to the drawings. Note that the present invention is not limited to the embodiment.

Embodiment

[Configuration of information Processing Apparatus According to Embodiment]

Figure 1:
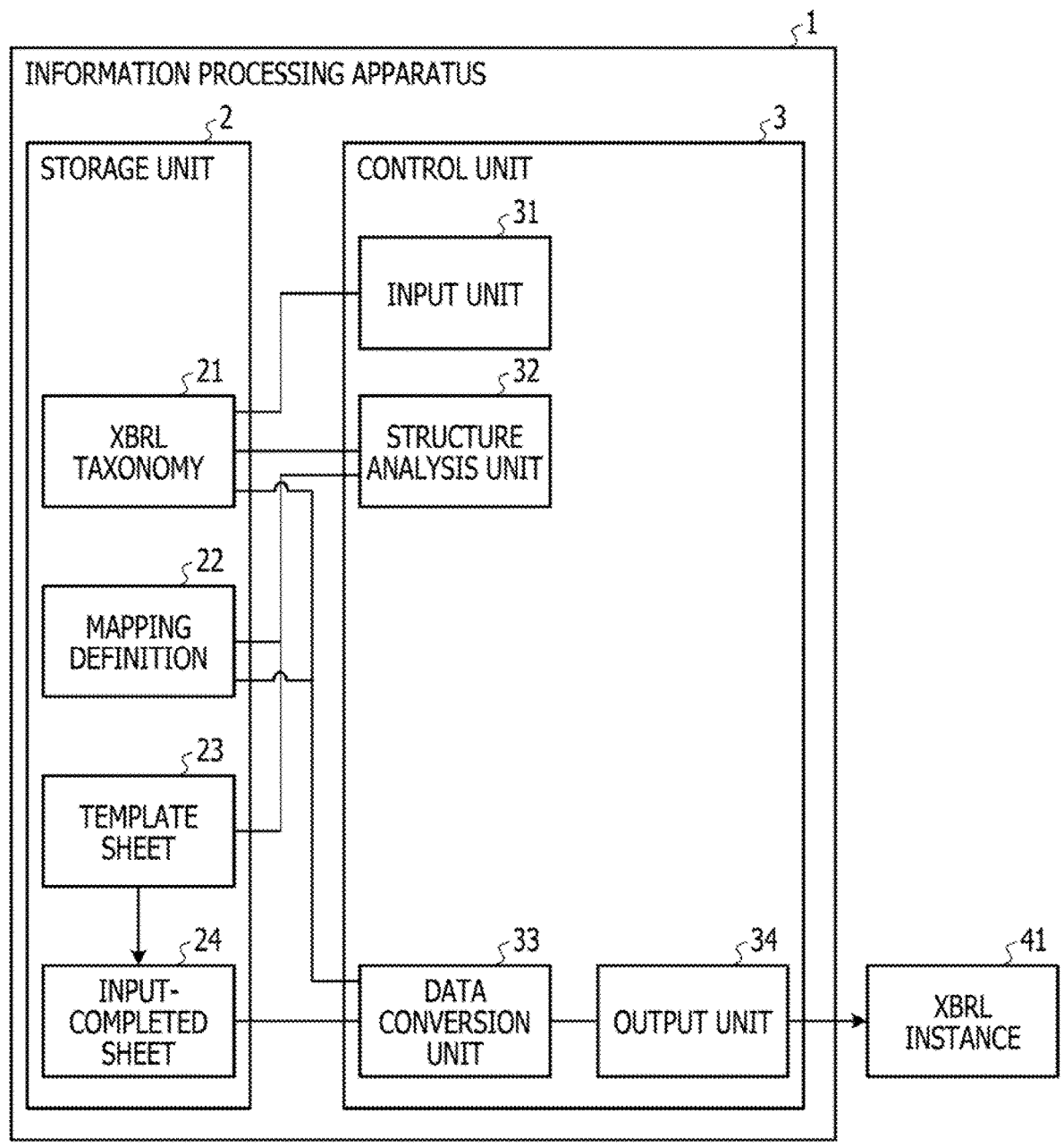
FIG. 1 is a functional block diagram illustrating a configuration of an information processing apparatus according to an embodiment.

FIG. 1 is a functional block diagram illustrating a configuration of an information processing apparatus according to an embodiment. As illustrated in FIG. 1, an information processing apparatus 1 converts data in a table format into an instance described in XBRL while absorbing a fluctuation in description content of the data in the table format. The instance here is referred to as "XBRL instance". The conversion here is synonymous with "mapping".

The information processing apparatus 1 includes a storage unit 2 and a control unit 3.

The storage unit 2 corresponds to a storage device such as a non-volatile semiconductor memory element, for example, a Flash Memory, a Ferroelectric Random Access Memory (FRAM) (registered trademark), and the like. Then, the storage unit 2 includes an XBRL taxonomy 21, a mapping definition 22, a template sheet 23, and an input-completed sheet 24.

The XBRL taxonomy 21 is a definition of a system of XBRL elements and includes a schema, a link base, and a table link base. The schema is a dictionary that stores attribute information such as a name or a data type of the XBRL element and corresponds to an "item definition" in the embodiment. The link base is, for example, a document in which a parent-child relationship, a display order, a display name, or the like between the XBRL elements are described. The table link base is a document in which a table layout of the XBRL element is described and corresponds to a "table layout" in the embodiment.

The mapping definition 22 defines data type combination information of a header (title) portion in the table. In the mapping definition 22, for example, a data type combination of a header portion in the X axis, a header portion in the Y axis, and a header portion of the Z axis is defined. The data type includes, for example, a character string type, a date type, and a numerical value type. However, the data type is not limited to these. Furthermore, the mapping definition 22 defines association between a cell in the table and an XBRL element and a hierarchical structure of a header in a case where the header has a hierarchy. For example, in information regarding the association between the cell in the table and the XBRL element, a position of a column of a cell in a header portion or an input portion in the table and property information and property information of the XBRL element corresponding to the cell are defined. In the hierarchical structure of the header, in a case where a first cell and a second cell in the header have a hierarchical structure, a character string in a column of the first cell and input content of an input portion and a character string of initial display in a column of the second cell are defined. Note that the mapping definition 22 is generated by the structure analysis unit 32 described later. Furthermore, an example of content of the mapping definition 22 is described later.

The template sheet 23 is a general-purpose template sheet indicating an input form reproducing the financial statements. The template sheet 23 indicates a table created by spreadsheet software such as Excel. Note that the template sheet 23 is defined by using the table link base (table layout) and is generated by a structure analysis unit 32 described later. Furthermore, an example of content of the template sheet 23 will be described later.

The input-completed sheet 24 is a sheet obtained by inputting the financial data to the template sheet 23. The input-completed sheet 24 is input by a user. The user is, for example, a person in charge of the company that submits the financial statements.

The control unit 3 includes an internal memory for storing a program prescribing various processing procedures and control data and executes various processing by using the stored programs and data. Then, the control unit 3 corresponds to, for example, an integrated circuit such as an Application Specific Integrated Circuit (ASIC) or a Field Programmable Gate Array (FPGA) or an electronic circuit such as a Central Processing Unit (CPU) or a Micro Processing Unit (MPU). Moreover, the control unit 3 includes an input unit 31, the structure analysis unit 32, a data conversion unit 33, and an output unit 34. Note that the data conversion unit 33 is an example of an acquisition unit, a specification unit, a determination unit, and an evaluation unit.

The input unit 31 inputs the XBRL taxonomy 21 and stores the input XBRL taxonomy 21 in the storage unit 2.

The structure analysis unit 32 analyzes the XBRL taxonomy 21 and generates the mapping definition 22 and the template sheet 23 according to the definition of the table link base (table layout). The structure analysis unit 32 stores the generated mapping definition 22 and template sheet 23 in the storage unit 2.

[Example of Template Sheet]

Figure 2:
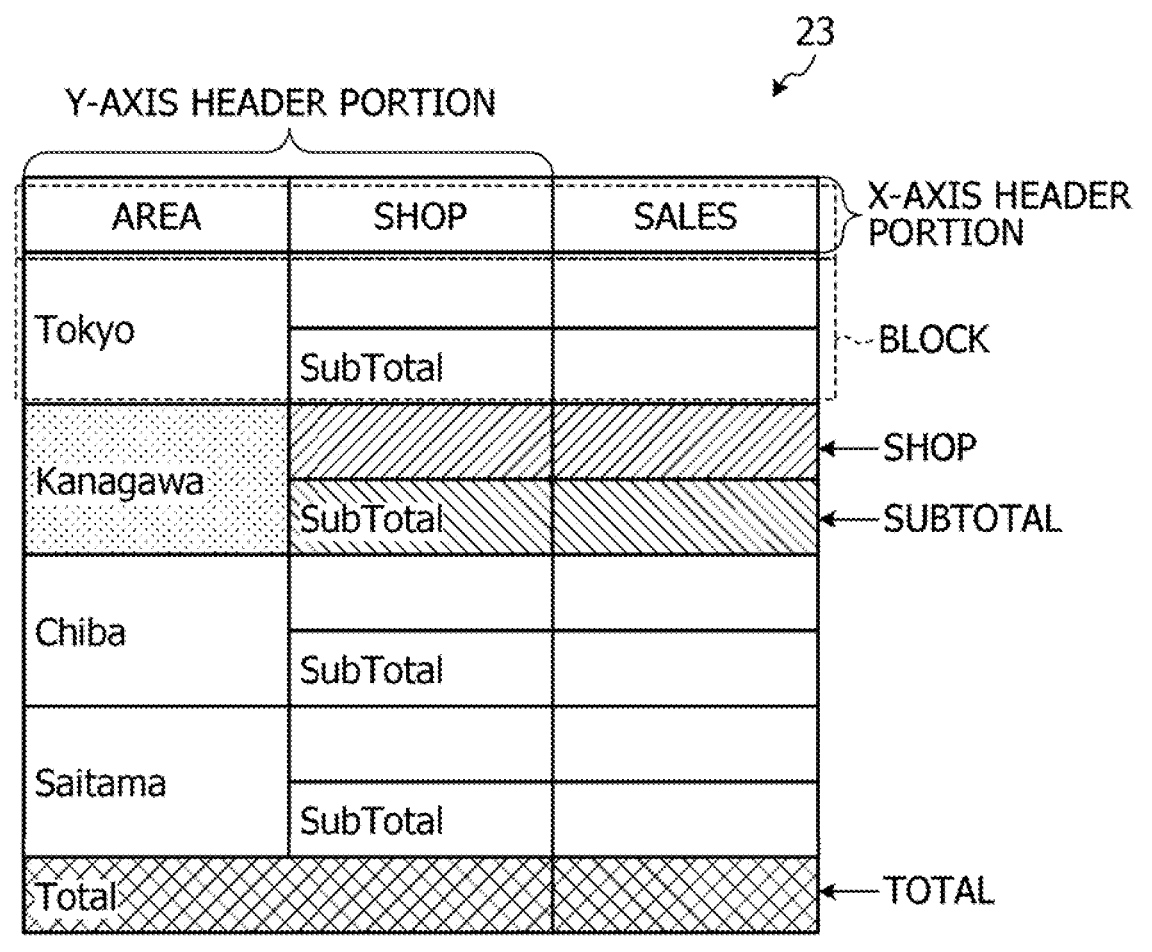

Here, an example of the template sheet 23 will be described with reference to FIG. 2. FIG. 2 is a diagram illustrating an example of a template sheet according to the embodiment. Note that it is assumed that the template sheet 23 described with reference to FIG. 2 be a template of a sales list of all shops of a certain company.

As illustrated in FIG. 2, the template sheet 23 includes title lines in a header portion in the Y axis and a header portion in the X axis. Furthermore, the template sheet 23 includes a plurality of blocks after the title line. That is, In the template sheet 23, a single table includes the title line and the plurality of blocks. In FIG. 2, in the template sheet 23, after the blocks corresponding to a plurality of areas, a total (Total) block is arranged in the final row. Note that arrangement order of the blocks is defined by the XBRL taxonomy 21.

Furthermore, an AREA column and a SHOP column in the Y-axis header portion have a parent-child relationship and form a hierarchical structure. Note that the hierarchical structure of the Y-axis header portion is defined by the XBRL taxonomy 21.

The block includes the AREA column, the SHOP column, and a SALES column. The AREA column indicates a name of an area (area name). To AREA column, each area name is set. Each area name and order of each area name are defined by the table layout of the XBRL taxonomy 21. To the SHOP column, each shop name and a fixed character string "SubTotal" of subtotal are set. Each shop name is input by the user. The fixed character string "SubTotal" of the subtotal is defined by the table layout of the XBRL taxonomy 21. To the SALES column, a value of sales of each shop and a value of the subtotal in the block are input by the user. Note that the shop name in the SHOP column in the block is added by the user as necessary. The shop name is an optional character string. The subtotal is positioned in the final row of the block.

The last block includes a combined cell of the AREA column and the SHOP column and a cell of the SALES column. In the combined cell, a fixed character string "Total" of a total is set. The fixed character string "Total" of the total is defined by the table layout of the XBRL taxonomy 21. To the cell in the SALES column, a total value of the shops in all the blocks is input by the user.

Furthermore, each data type is set for each cell of the template sheet 23. The data type of each cell is defined by the item definition of the XBRL taxonomy 21.

[Example of Mapping Definition]

FIG. 3 is a diagram illustrating an example of a mapping definition according to the embodiment. Note that it is assumed that the mapping definition 22 described with reference to FIG. 3 be a definition regarding mapping of a sales list of all shops of a certain company. As illustrated in FIG. 3, the mapping definition 22 includes information regarding association between the cell and the XBRL element. The following information is described in the information regarding the association between the cell and the XBRL element. In a case of an area, a cell in which a value is set or input to a column A is associated with a value of <Area> property of <Sales> element indicating the XBRL element. Furthermore, in a case of the total, the cell is associated with a value "Total" of <Level> property of <Sales> element indicating the XBRL element. In a case of shop, a cell in which a value is set or input to a column B is associated with a value of <Shop> property of <Sales> element indicating the XBRL element. Furthermore, in a case of subtotal, the cell is associated with a value "Total" of <Level> property of <Sales> element indicating the XBRL element. A cell in which a value is input to a column C is associated with a value of <Sales> element indicating the XBRL element.

Furthermore, the mapping definition 22 further includes information regarding a hierarchical structure of the Y-axis header. In other words, hierarchical structures of the AREA column and the SHOP column in the Y-axis header portion are defined. In a case where the value in the AREA column in the Y-axis header portion is "Tokyo", shop in the SHOP column in the Y-axis header portion is repeated, and the fixed character string "SubTotal" of the subtotal is set to the final row of the "Tokyo" block. Furthermore, in a case where the value of the AREA column in the Y-axis header portion is "Saitama", the shop in the SHOP column in the Y-axis header portion is repeated, and the fixed character string "SubTotal" of the subtotal is set to the final row of the "Saitama" block. Then, in a case where the value of the AREA column in the Y-axis header portion is "Total", all the blocks are completed.

Note that, although not illustrated, the mapping definition 22 further includes data type combination information. For example, a data type combination of the X-axis header portion is set to the data type combination information. A data type combination of the Y-axis header portion is set to the data type combination information. Combination information of the value cell portion to which a value is input is set to the data type combination information. For example, "character string type, character string type" is set as the data type combination of the Y-axis header portion. The "numerical value type" is set as the data type combination of the X-axis header portion.

[Example of Input-Completed Sheet]

FIG. 4 is a diagram illustrating an example of an input-completed sheet according to the embodiment. The input-completed sheet 24 illustrated in FIG. 4 indicates a result obtained by inputting financial data to the template sheet 23 illustrated in FIG. 2 by the user. The input-completed sheet 24 includes the plurality of blocks.

In the final row of each block, the character string of "SubTotal" is initially set in the "SHOP" column. Then, in the last block, the character string of "Total" is initially set in the combined cell of the AREA column and the SHOP column. Note that "SubTotal" and "Total" are initially set to the template sheet 23. Here, five blocks are illustrated. A "Tokyo" block, a "Kanagawa" block, a "Chiba" block, a "Saitama" block, and a "Total" block are illustrated. In FIG. 4, a plurality of shop names is included in the shop name in the SHOP column of each block. However, the number of shop names may be one or zero, and the number of shop names is not limited. In a case where the number of shop names is zero, it is sufficient that the shop name be set to be blank.

[Another Example of Input-Completed Sheet]

FIG. 5 is a diagram illustrating another example of the input-completed sheet according to the embodiment. The input-completed sheet 24 illustrated in FIG. 5 indicates a result obtained by inputting financial data to the template sheet 23 illustrated in FIG. 2 by the user, and this is the same as the input-completed sheet 24 illustrated in FIG. 4.

In the final row of each block, a character string of "SubTotal" is set in the "SHOP" column as initial display. However, there is a case where the set character string is changed. For example, a reference a1 indicates a case where a user changes a head character "S" of the character string "SubTotal" in the initial display to a lowercase letter "s". Furthermore, a reference a2 indicates a case where the user changes all the characters of the character string "SubTotal" in the initial display to lowercase letters. Furthermore, a reference a3 indicates a case where the user adds a blank to the end of the character string "SubTotal" in the initial display. Furthermore, a reference a4 indicates a case where the user changes all the characters of the character string "SubTotal" in the initial display to full-width characters. Note that a case where the user changes the character string in the initial display has been described. However, the present invention is not limited to this case, and may be a case where spreadsheet software automatically changes the character string in the initial display according to a format of a cell.

When such a character string in the initial display is changed, the changed character string and the character string that is a target of the mapping definition 22 do not completely coincide with each other when the input-completed sheet 24 is converted into the XBRL instance 41 by using the mapping definition 22, and the mapping engine assumes the inconsistency as an error. Therefore, when the input-completed sheet 24 is converted into the XBRL instance 41 by using the mapping definition 22, the following data conversion unit 33 normalizes and compares the character string in the input-completed sheet 24 and the character string that is the target of the mapping definition 22 regarding the character string of the subtotal in the block. When the character strings completely coincide with each other, the data conversion unit 33 evaluates the character string as the final row of the block. This case will be described.

Referring back to FIG. 1, the data conversion unit 33 specifies a first row and a second row associated with order having a predetermined relationship with order associated with the first row from among the rows included in the plurality of rows, with reference to the input-completed sheet 24. For example, the data conversion unit 33 acquires title lines in the header portions in the Y and X axes with reference to the input-completed sheet 24. The data conversion unit 33 specifies the first row after the header portion and the second row following the first row with reference to the input-completed sheet 24 and reads the two specified rows.

Furthermore, the data conversion unit 33 determines whether or not an item value associated with a first item among item values included in the first row is different from an item value associated with the first item among item values included in the second row. In a case where the item value associated with the first item in the first row is different from the item value associated with the first item in the second row, the data conversion unit 33 expects that the first row is the final row of the block. In other words, the data conversion unit 33 expects that the first row is a break between row groups. Then, the data conversion unit 33 determines whether or not an item value associated with a second item included in the first row satisfies a condition. For example, the data conversion unit 33 determines whether or not a cell value associated with an AREA item among cell values included in the first row is different from a cell value associated with an AREA item among cell values included in the second row. In a case where the cell values are different from each other, the data conversion unit 33 expects that the first row is the final row of the block and determines whether or not a cell value associated with a SHOP item included in the first row satisfies a condition. In other words, the data conversion unit 33 determines whether or not the cell value associated with the SHOP item included in the first row satisfies the condition such that the cell value coincides with a target character string defined by the mapping definition 22. As an example, the data conversion unit 33 normalizes the cell value associated with the SHOP item included in the first row and the target character string defined by the mapping definition 22 and determines whether or not the normalized values and the normalized character string completely coincide with each other. The normalization here is, for example, to remove blanks before and after the target cell value and the target character string, unify them all in lowercase, and unify them all in half-width characters.

Furthermore, the data conversion unit 33 evaluates the first row on the basis of the determination result as to whether or not the condition is satisfied. For example, in a case where it is determined that the condition is satisfied, the data conversion unit 33 evaluates that the first row is the final row of the block. In other words, the data conversion unit 33 evaluates that the first row is a break row between the row groups. Then, the data conversion unit 33 acquires the cell value associated with the SHOP item in the first row, maps the row of the acquired cell value, and adds the row to the XBRL instance 41. For example, in a case of the input-completed sheet 24 illustrated in FIG. 5, the cell value associated with the SHOP item includes "subTotal", "sub-total", "SubTotal", and "SubTotal". Furthermore, in a case where it is determined that the condition is not satisfied, the data conversion unit 33 notifies that the acquired cell value is invalid.

Note that, in a case where the item value associated with the first item in the first row is the same as the item value associated with the first item in the second row, the data conversion unit 33 determines that the first row and the second row are in the same block. Then, it is sufficient that the data conversion unit 33 map and add the row of the cell value associated with the SHOP item included in the first row to the XBRL instance 41. For example, in a case of the input-completed sheet 24 illustrated in FIG. 5, the cell value associated with the SHOP item includes "Shinjyuku", "Ikebukuro", . . . , "Ueno" in a case where the cell value of AREA is "Tokyo".

The output unit 34 outputs the XBRL instance 41 that indicates the result of the conversion by the data conversion unit 33. For example, the output unit 34 may output the XBRL instance 41 that is the conversion result to a monitor or may store the XBRL instance 41 in the storage unit 2.

[Image of Structure Analysis Processing]

Figure 6:
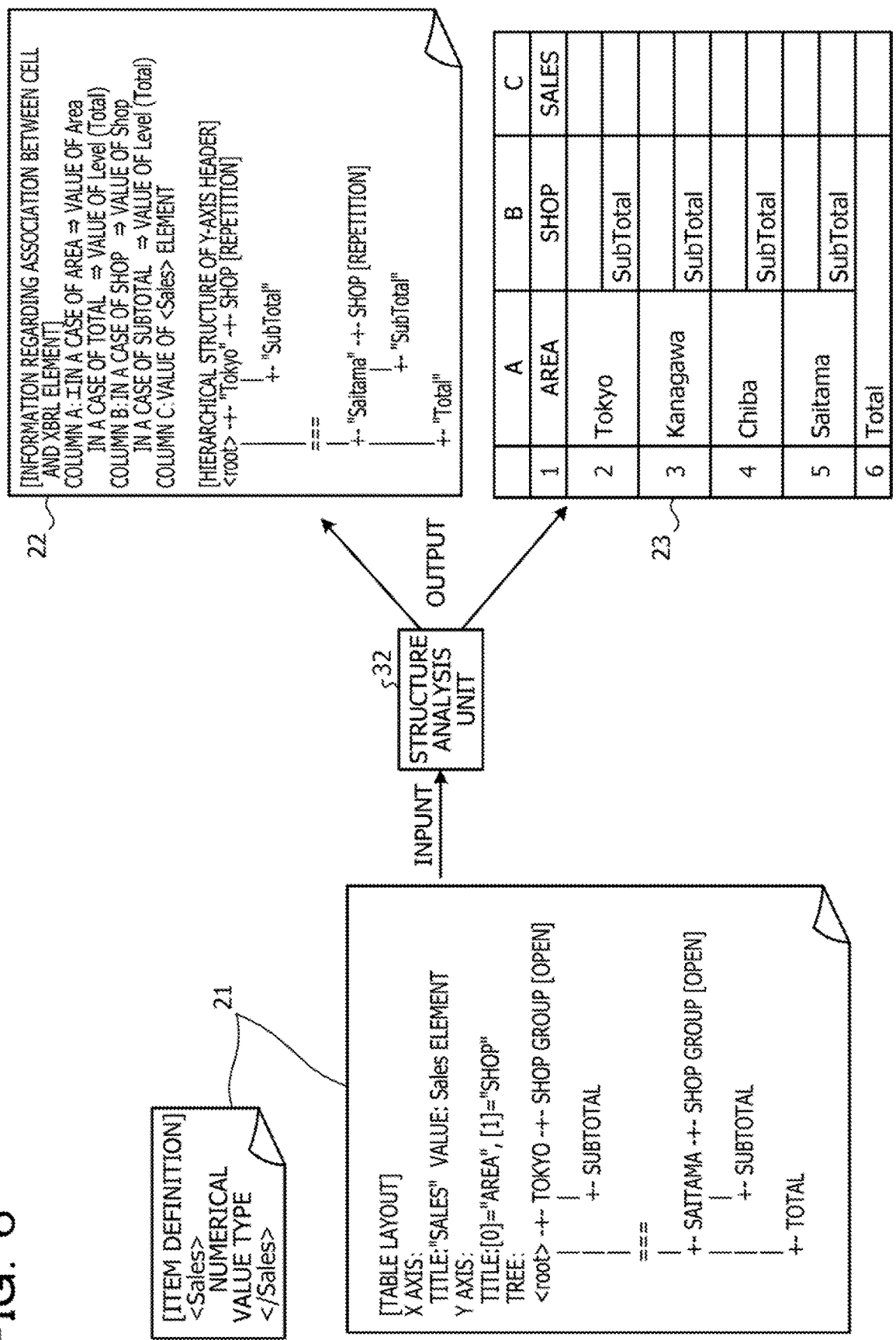
FIG. 6 is a diagram illustrating an image of structure analysis processing according to the embodiment.

Here, an image of structure analysis processing according to the embodiment will be described with reference to FIG. 6. FIG. 6 is a diagram illustrating the image of the structure analysis processing according to the embodiment. As illustrated in FIG. 6, the structure analysis unit 32 inputs the XBRL taxonomy 21. Then, the structure analysis unit 32 analyzes the input XBRL taxonomy 21 and generates and outputs the mapping definition 22 and the template sheet 23.

For example, the structure analysis unit 32 acquires a layout (arrangement order) of the header portions and the value cell portions in the X and Y axes from the table layout of the XBRL taxonomy 21. The structure analysis unit 32 acquires the information regarding the header portions in the X and Y axes and the data type of the value cell portion from the table layout of the XBRL taxonomy 21. The information regarding the header portions in the X and Y axes includes the character string of the title and the data type of the value. Here, the title is "SALES" in the X axis. Then, the data type of the value of the Sales element indicates the numerical value type. Note that the data type of the XBRL element is acquired from the item definition. Furthermore, in the Y axis, values of "AREA" and "SHOP" are arranged in this order as titles. Then, the layout (arrangement order) of the AREA column and the SHOP column is acquired from a tree.

Then, the structure analysis unit 32 generates the template sheet 23 according to the analyzed layout (arrangement order) and outputs the generated template sheet 23.

Then, the structure analysis unit 32 sets the information regarding the XBRL element corresponding to each cell of the template sheet 23 as the information regarding the association between the cell of the mapping definition 22 and the XBRL element. The structure analysis unit 32 sets the hierarchical structure of the Y-axis header portion according to the analyzed layout (arrangement order). Here, in the Y-axis header portion, in a case where AREA is "Tokyo", the shop is repeated as SHOP, and "SubTotal" is set as the subtotal at the end. Similarly, in a case where AREA is "Saitama", the shop is repeated as SHOP, and "Subtotal" as the subtotal is set at the end. Then, in a case where AREA is "Total", the hierarchical structure of the Y-axis header portion ends.

[Image of Data Conversion Processing]

Figure 7:
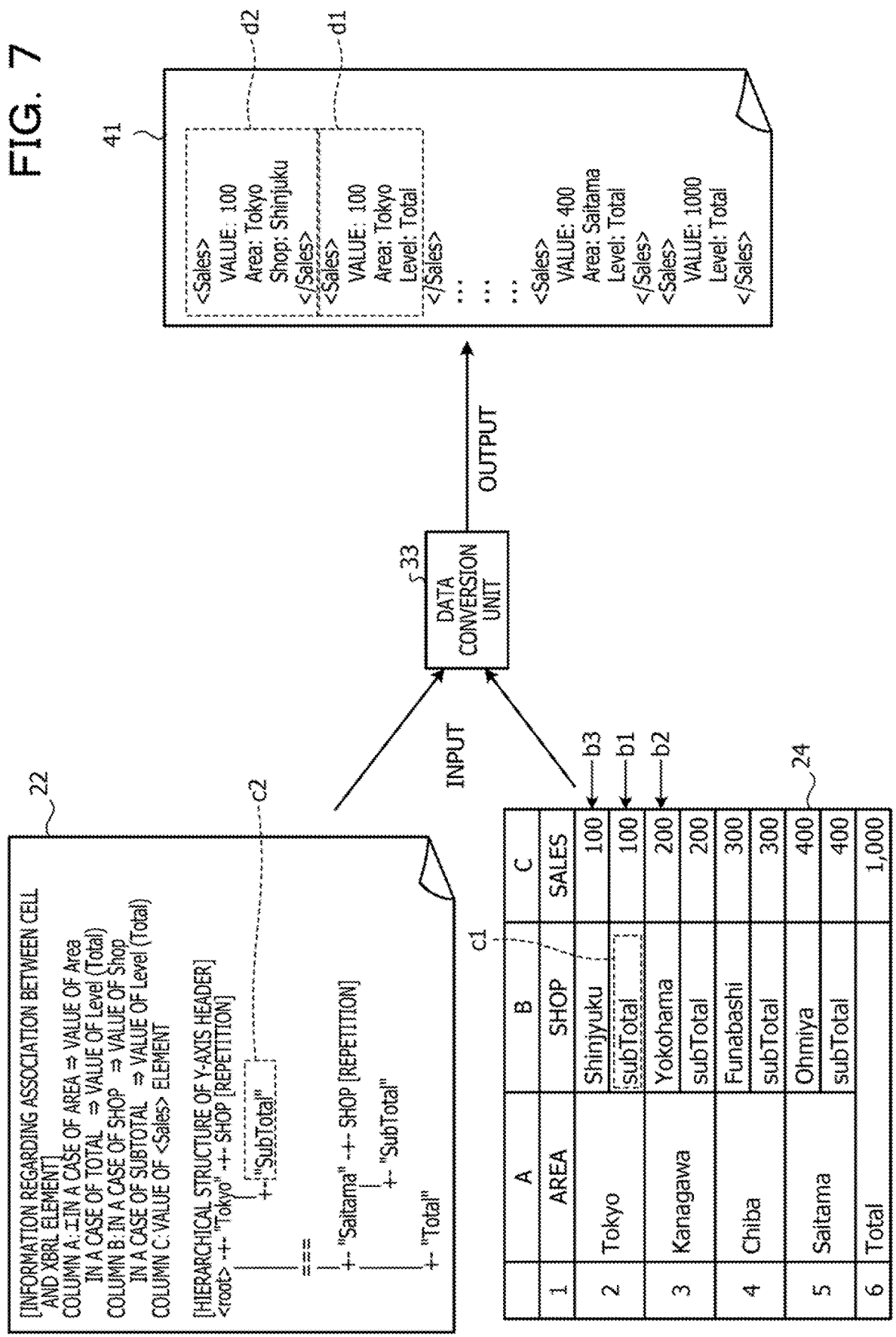
FIG. 7 is a diagram illustrating an image of data conversion processing according to the embodiment.

Here, an image of data conversion processing according to the embodiment will be described with reference to FIG. 7. FIG. 7 is a diagram illustrating an image of the data conversion processing according to the embodiment. As illustrated in FIG. 7, when converting the input-completed sheet 24 into the XBRL instance 41 by using the mapping definition 22, the data conversion unit 33 reads a single row in advance and determines whether or not the character string of the subtotal in the first row satisfies a condition at a timing when the area name read in the row read in advance is different from the area name in the first row.

For example, the data conversion unit 33 specifies two rows after the header portion with reference to the input-completed sheet 24 and reads the two specified rows. The data conversion unit 33 determines whether or not a cell value associated with the AREA item among the cell values included in the first row is different from a cell value associated with the AREA item among cell values included in the second row. Here, as an example, it is assumed that the first row be a row indicated by a reference b1 and the second row be a row indicated by a reference b2. Then, a cell value associated with the AREA item in the first row is "Tokyo", and a cell value associated with the AREA item in the second row is "Kanagawa". Therefore, it is determined that the cell value associated with the AREA item in the first row is different from the cell value associated with the AREA item in the second row. In this case, it is expected that the first row is the final row of the block.

Then, the data conversion unit 33 determines whether or not the cell value associated with the SHOP item included in the first row satisfies the condition such that the cell value coincides with a target character string defined by the mapping definition 22. As an example, the data conversion unit 33 normalizes the cell value associated with the SHOP item included in the first row and the target character string defined by the mapping definition 22 and determines whether or not the normalized value and the normalized character string completely coincide with each other. Here, it is assumed that the first row be a row indicated by a reference b1. Then, a cell value associated with the SHOP item included in the first row is "subTotal" (reference c1). A target character string defined by the mapping definition 22 is "SubTotal" (reference c2). It is assumed that the normalization here be to remove blanks before and after the target cell value and the target character string, unify them all in lowercase, and unify them all in half-width characters. Then, a value obtained by normalizing "subTotal" indicated by the reference c1 is "subtotal". A character string obtained by normalizing "SubTotal" indicated by the reference c2 is "subtotal". Therefore, it is determined that the normalized value and the normalized character string completely coincide with each other.

Then, in a case where it is determined that the condition is satisfied, the data conversion unit 33 evaluates that the first row is the final row of the block. In other words, the data conversion unit 33 evaluates that the first row is a break between the blocks. Then, the data conversion unit 32 maps the row of the cell value associated with the SHOP item in the first row and adds the row to the XBRL instance 41. Here, the row indicated by the reference b1 is mapped by using the mapping definition 22, and the mapping result (reference d1) is added to the XBRL instance 41. Note that, in a case where it is determined that the condition is not satisfied, the data conversion unit 33 notifies that the acquired cell value is invalid.

Furthermore, in a case where a cell value associated with the AREA item among the cell values included in the first row is the same as a cell value associated with the AREA item among the cell values included in the second row, the data conversion unit 33 determines that the first row and the second row are in the same block. Then, the data conversion unit 33 maps and adds the row of the cell value associated with the SHOP item included in the first row to the XBRL instance 41. Here, the row indicated by the reference b3 is mapped by using the mapping definition 22, and the mapping result (reference d2) is added to the XBRL instance 41.

In this way, when the input-completed sheet 24 is converted into the XBRL instance 41 by using the mapping definition 22, the data conversion unit 33 compares the character string of the subtotal with the target character string in the mapping definition 22 after normalizing the character strings. Therefore, the data conversion unit 33 can appropriately perform mapping even when the description of the character string of the subtotal is fluctuated. Furthermore, the data conversion unit 33 processes by two rows. In a case where the area name in the second row is different from the area name in the first row, the data conversion unit 33 can assume that the first row is a break between the blocks and includes the subtotal. Therefore, the data conversion unit 33 can normalize the character string of the subtotal together with the target character string in the mapping definition 22 at this timing and compare the character strings with each other. Therefore, the data conversion unit 33 can reduce an entire processing time than that in a case where not only the character string of the subtotal but also other character strings are normalized row by row together with the target character string of the mapping definition 22 and are compared with each other.

[Flowchart of Data Conversion Processing]

Figure 8A:
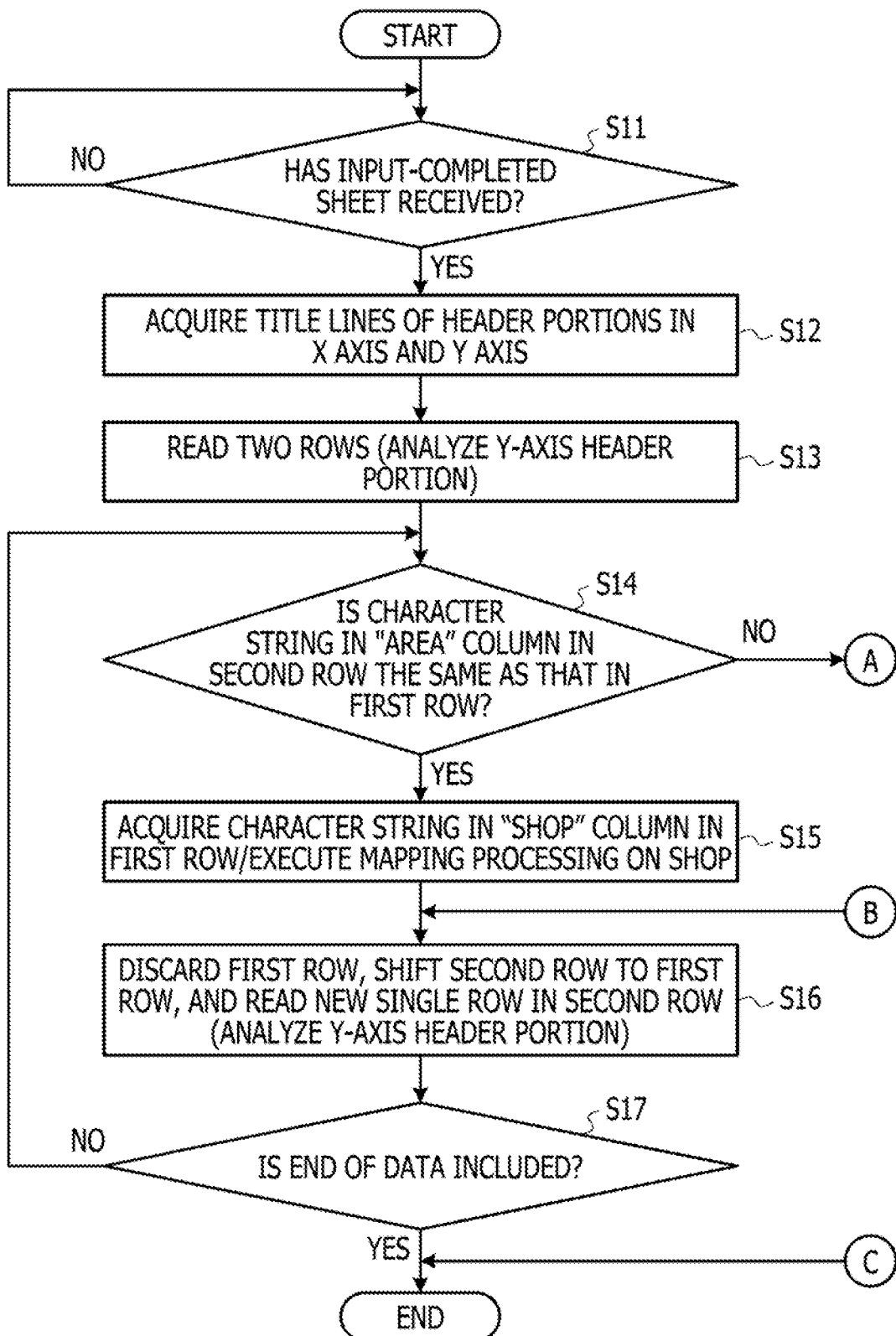
FIGS. 8A and 8B are a diagram illustrating an example of a flowchart of the data conversion processing according to the embodiment.
Figure 8B:
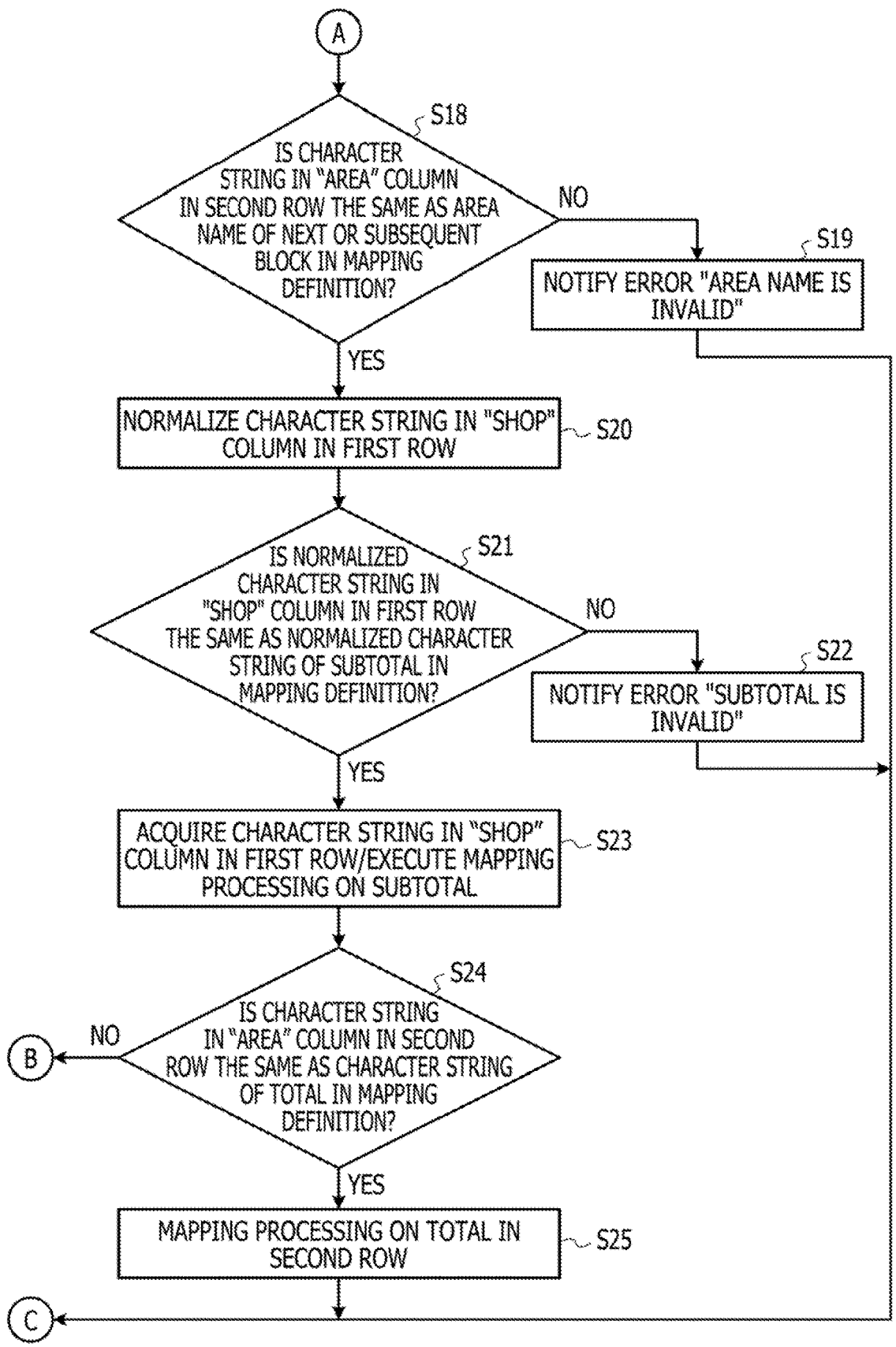

Next, a flowchart of the data conversion processing according to the embodiment will be described with reference to FIGS. 8A and 8B. FIGS. 8A and 8B are a diagram illustrating an example of the flowchart of the data conversion processing according to the embodiment. Note that it is assumed that the input-completed sheet 24 be input to the template sheet 23 illustrated in FIG. 2.

First, the data conversion unit 33 determines whether or not the input-completed sheet 24 is received (step S11). In a case where it is determined that the input-completed sheet 24 is not received (step S11; No), the data conversion unit 33 repeats the determination processing until the input-completed sheet 24 is received.

In a case where it is determined that the input-completed sheet 24 is received (step S11; Yes), the data conversion unit 33 acquires title lines of the header portions in the X and Y axes (step S12). The data conversion unit 33 reads two rows after the header portion as analysis target rows (step S13).

Then, the data conversion unit 33 determines whether or not a character string in the AREA" column in the second row is the same as that in the first row (step S14). In a case where it is determined that the character strings are the same (step S14; Yes), the data conversion unit 33 acquires a character string of the shop in the "SHOP" column in the first row and executes mapping processing on the shop by using the mapping definition 22 (step S15).

Then, the data conversion unit 33 discards the first row, shifts the second row to the first row, and reads a new single row in the second row (step S16). The data conversion unit 33 determines whether or not the read single row includes an end of the data (step S17). A record including the end of the data indicates, for example, a blank row (row to which nothing is set). In a case where it is determined that the read single row is a row including the end of the data (step S17; Yes), the data conversion unit 33 determines that the row is the final row of the input-completed sheet 24 and ends the data conversion processing.

In a case where it is determined that the read single row does not include the end of the data (step S17; No), the data conversion unit 33 shifts to step S14 so as to process two new rows.

In a case where it is determined in step S14 that the character string in the "AREA" column in the second row is not the same as that in the first row (step S14; No), the data conversion unit 33 determines that the first row is the final row of the block. In other words, the data conversion unit 33 determines that the second row is the start row of the block. Then, the data conversion unit 33 determines whether or not the character string in the "AREA" column in the second row is the same as an area name of the next block of the mapping definition 22 (step S18).

In a case where it is determined that the character string and the area name are not the same (step S18; No), the data conversion unit 33 indicates an error and notifies that the area name is invalid (step S19) and ends the data conversion processing.

In a case where it is determined that the character strings are the same (step S18; Yes), the data conversion unit 33 normalizes the character string in the "SHOP" column in the first row (step S20). In other words, the data conversion unit 33 normalizes the character string of the subtotal.

Then, the data conversion unit 33 determines whether or not the normalized character string in the "SHOP" column in the first row is the same as the normalized character string of the subtotal (for example, "subtotal") in the mapping definition 22 (step S21). In a case where it is determined that the character strings are not the same (step S21; No), the data conversion unit 33 indicates an error and notifies that the subtotal is invalid (step S22) and ends the data conversion processing.

In a case where it is determined that the character strings are the same (step S21; Yes), the data conversion unit 33 acquires the character string of the subtotal that is the character string in the "SHOP" column in the first row and executes the mapping processing on the subtotal (step S23).

Then, the data conversion unit 33 determines whether or not the character string in the "AREA" column in the second row is the same as the character string of the total (for example, "Total") in the mapping definition 22 (step S24). In a case where it is determined that the character strings are not the same (step S24; No), the data conversion unit 33 shifts to step S16 so as to read the next row.

In a case where it is determined that the character strings are the same (step S24; Yes), the data conversion unit 33 executes the mapping processing on the total in the second row (step S25). Then, the data conversion unit 33 ends the data conversion processing.

[Example of Use of information Processing Apparatus]

Figure 9:
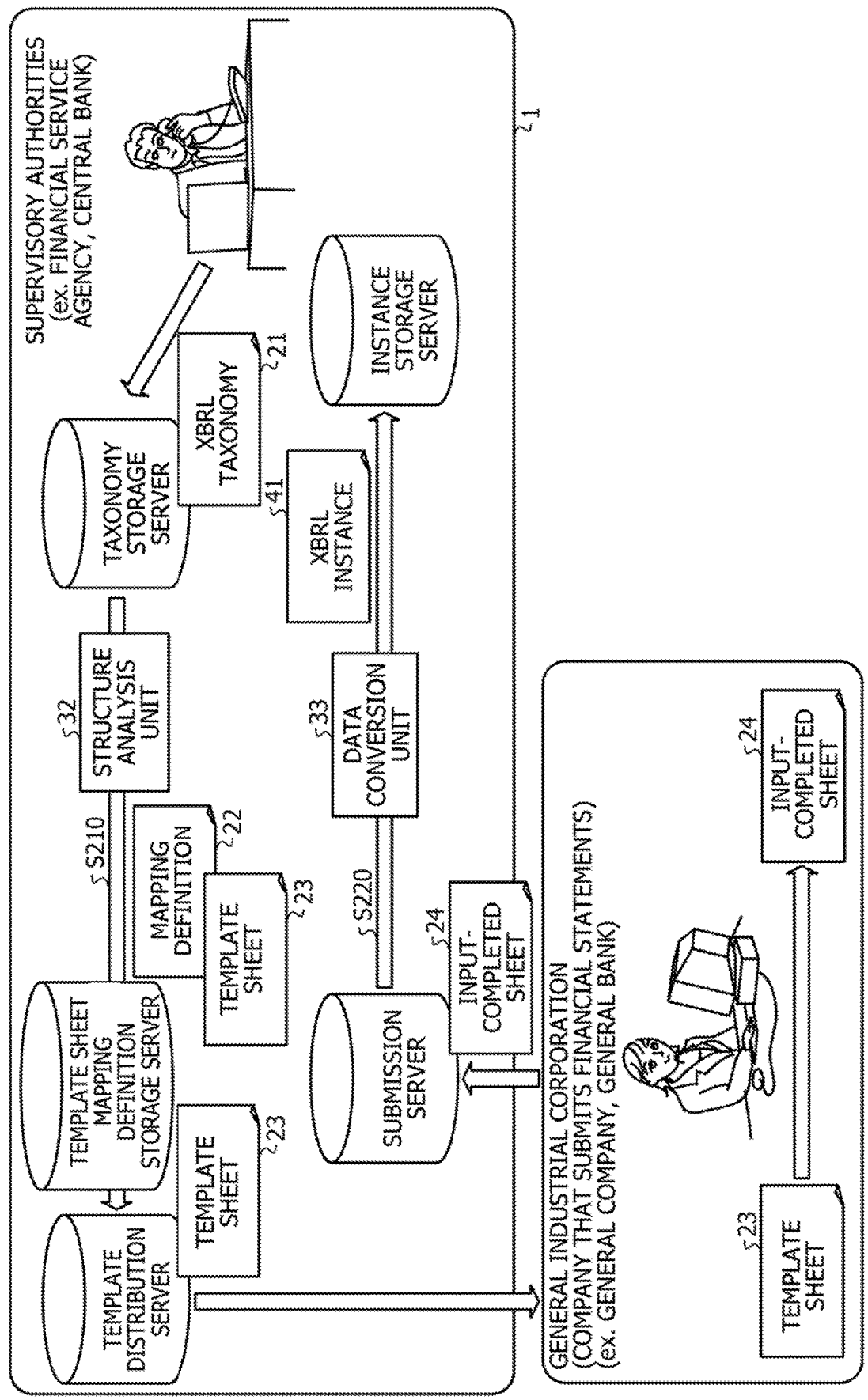
FIG. 9 is a diagram illustrating an example of a use of the information processing apparatus according to the embodiment.

Next, an example of a use of the information processing apparatus according to the embodiment will be described with reference to FIG. 9. FIG. 9 is a diagram illustrating an example of the use of the information processing apparatus according to the embodiment. As illustrated in FIG. 9, the information processing apparatus 1 is provided on the side of the supervisory authority. The supervisory authority creates the XBRL taxonomy 21. Then, the structure analysis unit 32 inputs the created XBRL taxonomy 21 and generates the template sheet 23 and the mapping definition 22 by using the input XBRL taxonomy 21 (S210). The supervisory authority opens the generated template sheet 23 and mapping definition 22 to the public and allows the company that submits the financial statements to acquire the template sheet 23. The company that submits the financial statements inputs financial data by using the acquired template sheet 23 and creates the input-completed sheet 24. Then, the data conversion unit 33 inputs the input-completed sheet 24 and converts the input input-completed sheet 24 into the XBRL instance 41 (S220).

Note that the information processing apparatus 1 illustrated in FIG. 9 is a server model provided on the side of the supervisory authority. However, the information processing apparatus 1 is not limited to this. The information processing apparatus 1 may be a client model provided on the side of the company that submits the financial statements.

Effect of Embodiment

According to the above embodiment, the information processing apparatus 1 acquires a record group that includes a plurality of ordered records and in which each record has a plurality of item values respectively associated with a plurality of items. The information processing apparatus 1 specifies a first record and a second record associated with order having a predetermined relationship with order associated with the first record from among records included in the acquired record group. In a case where the item value associated with the first item among the item values included in the first record is different from the item value associated with the first item among the item values included in the second record, the information processing apparatus 1 determines whether or not the item value associated with the second item included in the first record satisfies the condition. The information processing apparatus 1 evaluates the first record on the basis of the determination result. According to the configuration, the information processing apparatus 1 can reduce a processing load regarding the evaluation on the record. For example, even when the description of the item value associated with the second item is fluctuated, the information processing apparatus 1 evaluates the first record, after normalizing the fluctuation in the description, at a timing when the item value associated with the first item of the first record is different from the item value associated with the first item of the second record. Therefore, the entire processing time can be reduced. In other words, the information processing apparatus 1 can reduce the entire processing time by determining whether or not a pinpoint item value associated with the second item (for example, character string of subtotal) satisfies the condition than a processing time obtained by determining whether or not the item value associated with the second item satisfies the condition by one record.

Furthermore, according to the above embodiment, the information processing apparatus 1 normalizes the item value associated with the second item included in the first record and determines whether or not the normalized item value coincides with a keyword that has been registered in advance. According to the configuration, the information processing apparatus 1 can efficiently determine the fluctuation in the description of the item value associated with the second item. As a result, even in a case where the description of the item value associated with the second item is fluctuated, the information processing apparatus 1 can execute the mapping processing on the item value after absorbing the fluctuation in the description.

Furthermore, according to the above embodiment, in a case where the normalized item value coincides with the keyword, the information processing apparatus 1 evaluates that the first record is a record serving as a break of the record group. According to the configuration, even when the description of the item value is fluctuated, the information processing apparatus 1 can continuously perform evaluation while absorbing the fluctuation in the description.

Furthermore, according to the above embodiment, in a case where the normalized item value does not coincide with the keyword, the information processing apparatus 1 evaluates that the first record is not the record serving as a break of the record group and notifies the evaluation result.

According to the configuration, the information processing apparatus 1 can notify that the item value is invalid.

[Program or the Like]

Note that, the information processing apparatus 1 can be realized by mounting each function of the above control unit 3, the storage unit 2, or the like on an information processing apparatus such as an existing personal computer or a workstation.

Furthermore, each component of the information processing apparatus 1 is not necessarily physically configured as illustrated in the drawings. In other words, specific aspects of separation and integration of the information processing apparatus 1 are not limited to the illustrated ones, and all or a part of the apparatus can be functionally or physically separated and integrated in an arbitrary unit according to various loads, use states, or the like. For example, the input unit 31 and the structure analysis unit 32 may be integrated as a single unit. The data conversion unit 33 and the output unit 34 may be integrated as a single unit. On the other hand, the structure analysis unit 32 may be divided into a first generation unit that generates the mapping definition 22 and a second generation unit that generates the template sheet 23. Furthermore, the storage unit 2 such as the XBRL taxonomy 21, the mapping definition 22, the template sheet 23, or the input-completed sheet 24 may be connected via a network as an external device of the information processing apparatus 1.

Figure 10:
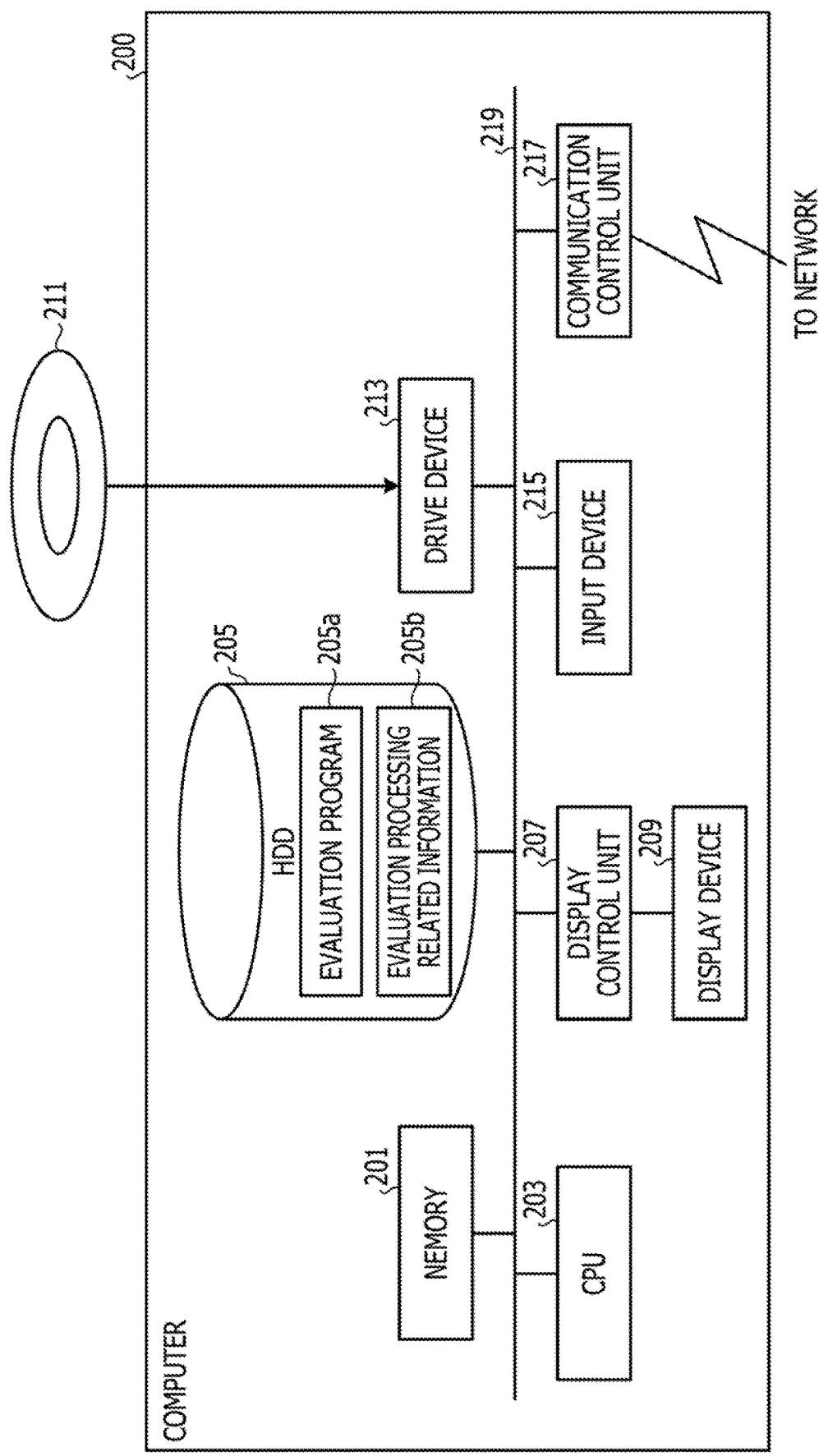
FIG. 10 is a diagram illustrating an example of a computer that executes an evaluation program.

Furthermore, various sorts of processing described in the above embodiment can also be implemented by executing a program prepared in advance on a computer such as a personal computer or a workstation. Therefore, in the following description, an example of the computer which executes an evaluation program realizing a function similar to the information processing apparatus 1 illustrated in FIG. 1 will be described. FIG. 10 is a diagram illustrating an example of a computer that executes the evaluation program.

As illustrated in FIG. 10, a computer 200 includes a Central Processing Unit (CPU) 203 that executes various calculation processing, an input device 215 that receives data input from a user, and a display control unit 207 that controls a display device 209. Furthermore, the computer 200 also includes a drive device 213 that reads a program or the like from a storage medium, and a communication control unit 217 that exchanges data with another computer via a network. Furthermore, the computer 200 includes a memory 201 that temporarily stores various information and a Hard Disk Drive (HDD) 205. Then, the memory 201, the CPU 203, the HDD 205, the display control unit 207, the drive device 213, the input device 215, and the communication control unit 217 are connected by a bus 219.

The drive device 213 is, for example, a device for a removable disk 211. The HDD 205 stores an evaluation program 205a and evaluation processing related information 205b.

The CPU 203 reads the evaluation program 205a and develops the program to a memory 201. The evaluation program 205a functions as an evaluation process.

For example, the evaluation process corresponds to each functional unit of the control unit 3. The evaluation processing related information 205b corresponds to the XBRL taxonomy 21, the mapping definition 22, the template sheet 23, and the input-completed sheet 24.

Note that the evaluation program 205a does not necessarily need to be stored in the HDD 205 from the beginning. For example, the program is stored in a "portable physical medium" such as a flexible disk (FD), a Compact Disk Read Only Memory (CD-ROM), a Digital Versatile Disk (DVD), a magneto-optical disk, or an integrated Circuit (IC) card, which are inserted into the computer 200. Then, the computer 200 may read the program 205a from these media and execute the program 205a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium recording an evaluation program for causing a computer to execute processing comprising:
   acquiring, in a process in which an input-completed sheet including a plurality of ordered records is converted to an eXtensible Business Reporting Language (XBRL) instance according to a layout defined by a XBRL taxonomy, a record group in which each record including a plurality of item values or a plurality of item character strings associated with a plurality of items from the input-completed sheet;
   specifying a first record and a second record which each has one or more item values or one or more character strings in an order of the plurality of items from among records included in the acquired record group;
   normalizing, in a case where an item value associated with the first item included in the first record is different from an item value associated with the first item included in the second record, an item value associated with the second item included in the first record and a keyword that has been registered in a mapping definition for the XBRL taxonomy in advance;
   determining whether or not the normalized item value coincides with the normalized keyword;
   evaluating that the first record is a record serving as a break of the record group in a case where the normalized item value coincides with the keyword;
   performing a mapping process on the one or more item values or the one or more character strings of the first record using the mapping definition when evaluating that the first record is the record serving as the break of the record group; and
   adding a mapped value to the XBRL instance.

2. The non-transitory computer-readable recording medium according to claim 1, wherein the normalizing processing includes removing blanks before and after a target item value and a target item character string, unifying the target character string all in lowercase or unifying the target character string all in half-width characters.

3. The non-transitory computer-readable recording medium according to claim 1, wherein the evaluating processing evaluates that the first record is not a record serving as a break of the record group in a case where the normalized item value does not coincide with the keyword and evaluates a next record.

4. An information processing apparatus comprising:
   a memory; and
   a processor coupled to the memory and configured to:
   acquire, in a process in which an input-completed sheet including a plurality of ordered records is converted to an eXtensible Business Reporting Language (XBRL) instance according to a layout defined by a XBRL taxonomy, a record group in which each record including a plurality of item values or a plurality of item character strings associated with a plurality of items from the input-completed sheet;
   specify a first record and a second record which each has one or more item values or one or more character strings in an order of the plurality of items from among records included in the record group;
   normalize, in a case where an item value associated with the first item included in the first record is different from an item value associated with the first item included in the second record, an item value associated with the second item included in the first record and a keyword that has been registered in a mapping definition for the XBRL taxonomy in advance;
   determine whether or not the normalized item value coincides with the normalized keyword;
   evaluate that the first record is a record serving as a break of the record group in a case where the normalized item value coincides with the keyword;
   perform a mapping process on the one or more item values or the one or more character strings of the first record using the mapping definition when evaluating that the first record is the record serving as the break of the record group; and
   add a mapped value to the XBRL instance.

5. An evaluation method for causing a computer to execute processing comprising:
   acquiring, in a process in which an input-completed sheet including a plurality of ordered records is converted to an eXtensible Business Reporting Language (XBRL) instance according to a layout defined by a XBRL taxonomy, a record group in which each record including a plurality of item values or a plurality of item character strings associated with a plurality of items from the input-completed sheet;
   specifying a first record and a second record which each has one or more item values or one or more character strings in an order of the plurality of items from among records included in the acquired record group;
   normalizing, in a case where an item value associated with the first item included in the first record is different from an item value associated with the first item included in the second record, an item value associated with the second item included in the first record and a keyword that has been registered in a mapping definition for the XBRL taxonomy in advance;
   determining whether or not the normalized item value coincides with the normalized keyword;
   evaluating that the first record is a record serving as a break of the record group in a case where the normalized item value coincides with the keyword;
   performing a mapping process on the one or more item values or the one or more character strings of the first record using the mapping definition when evaluating that the first record is the record serving as the break of the record group; and
   adding a mapped value to the XBRL instance.

* * * * *